(12) United States Patent
Ruben

(10) Patent No.: US 10,492,636 B2
(45) Date of Patent: Dec. 3, 2019

(54) SECURE DELIVERY SYSTEM

(71) Applicant: Aari Y Ruben, Tucson, AZ (US)

(72) Inventor: Aari Y Ruben, Tucson, AZ (US)

(*) Notice: Subject to any disclaimer, the term of this patent is extended or adjusted under 35 U.S.C. 154(b) by 0 days.

(21) Appl. No.: 15/932,571

(22) Filed: Mar. 15, 2018

(65) Prior Publication Data

US 2019/0282014 A1 Sep. 19, 2019

(51) Int. Cl.
| | |
|---|---|
| *A47G 29/14* | (2006.01) |
| *A47G 29/20* | (2006.01) |
| *G06Q 10/08* | (2012.01) |
| *G06K 19/07* | (2006.01) |
| *G07C 9/00* | (2006.01) |
| *H04W 4/80* | (2018.01) |

(52) U.S. Cl.
CPC ......... *A47G 29/141* (2013.01); *A47G 29/20* (2013.01); *G06K 19/0723* (2013.01); *G06Q 10/0832* (2013.01); *G07C 9/00896* (2013.01); *A47G 2029/145* (2013.01); *H04W 4/80* (2018.02)

(58) Field of Classification Search
CPC .......................... G05D 9/12; Y10T 137/7306
USPC ....................................................... 340/5.73
See application file for complete search history.

(56) References Cited

U.S. PATENT DOCUMENTS

| | | | | |
|---|---|---|---|---|
| 6,347,737 B1* | 2/2002 | Madruga | ................. | A47G 29/22 232/34 |
| 6,378,769 B1* | 4/2002 | Wolgamot | ................ | E06B 7/32 109/68 |
| 2001/0045449 A1* | 11/2001 | Shannon | .............. | A47G 29/141 232/19 |
| 2003/0132279 A1* | 7/2003 | Stemmle | ................ | A47G 29/12 232/31 |
| 2008/0050481 A1* | 2/2008 | Morris | .................... | A23B 7/148 426/232 |
| 2008/0067227 A1* | 3/2008 | Poss | ........................ | A47G 29/22 232/17 |
| 2008/0073421 A1* | 3/2008 | Nordgren | ................ | G06Q 99/00 232/43.1 |
| 2008/0121682 A1* | 5/2008 | Grim | ..................... | A47G 29/141 232/1 R |
| 2011/0041573 A1* | 2/2011 | Giles | ..................... | A47G 29/141 70/278.1 |
| 2012/0062362 A1* | 3/2012 | Rudduck | .............. | G06Q 10/083 340/5.64 |
| 2014/0346221 A1* | 11/2014 | Pendergast | ............. | A47G 29/12 232/34 |

\* cited by examiner

*Primary Examiner* — Ojiako K Nwugo
(74) *Attorney, Agent, or Firm* — Mark Ogram

(57) ABSTRACT

A package delivery system wherein packages are distributed through a distribution center's deliverymen. Badges are worn by the deliverymen. The badges include an electronic identifier identifying the deliveryman as well as the company/distribution center, that employs them. On approaching the building's receptacle, the signal from the badge allows the receptacle's locking mechanism to be functional; thereby allowing only authorized deliverymen to gain access to the interior of the receptacle.

16 Claims, 3 Drawing Sheets

SECURE DELIVERY SYSTEM

BACKGROUND OF THE INVENTION

This invention relates generally to package delivery and more specifically to a receptacle for the secure placement of the package.

Cyber shopping is quickly becoming the mode by which items are purchased. While the traditional brick and mortar store will remain, the volume of goods being purchased on-line is ever increasing.

While the purchasing ease via the Internet has been shown, the problem lies with the actual delivery of the goods. All too often the delivery person finds no one at home and is then forced to leave the goods by the front door. The unattended package is too much of an attraction for thieves so a large number of packages are "lost" and are usually re-sent forcing the Internet merchant or the delivery company to "eat" the loss.

It is clear there is a significant need for secure package delivery system.

SUMMARY OF THE INVENTION

The invention involves a package delivery system in which packages are distributed through a distribution center's deliverymen to container's accessible by a consumer. This type of distribution mechanism is well known and involves a large economic segment.

Delivery personnel wear a specialized badge which contains an electronic identification with data such as: the name of the personnel, their company, and a specific pass code.

Those of ordinary skill in the art readily recognize a variety of wireless communication apparatus which can be used in this context, including, but not limited to: U.S. Pat. No. 9,845,071, issued Dec. 19, 2017, to Krishnan and entitled: "Keyless Car Sharing Mechanism Using Smartphones and inbuilt WiFi System for Authentication"; U.S. Pat. No. 9,845,629, issued Dec. 19, 2017, to Washeleski et al. and entitled "Vehicle Keyless Entry Assembly having Capacitance Sensor Operative for Detecting Objects"; both of which are incorporated hereinto by reference.

The badges are worn by the delivery personnel in their rounds. On approaching the building's receptacle, the signal from the badge allows the receptacle's locking mechanism to be functional; thereby allowing only authorized delivery personnel to gain access to the interior of the receptacle. The receptacle alluws the depositing of the package into a secure environment and prevents thieves from gaining access to the package.

An important part of this invention is the container's own security measures. The package receptacle/container ideally contains two doors, one for the delivery personnel and one for the customer. The container, in the preferred embodiment, includes a logging system identifying when the doors are accessed.

In the preferred embodiment, the container is accessible by one door on the outside by the delivery personnel while the other door (for the customer to retrieve the package) is within the edifice. Both doors contain a lock which are ideally activated by a key or touchpad although wireless entry is also contemplated.

In an alternative embodiment, one of the doors is totally contained within the other. Either door is then designated for use by the delivery personnel with the remaining door for the customer.

In one embodiment, the receptacle includes a presence sensor adapted to determine if a package is within the container. If there is one, then an alert (such as a light or an audible alert) is given.

In yet another embodiment, the receptacle/container is equipped with an environmental system which maintains the interior of the container at a prescribed condition (such as cooled or heated). This environmental system is activated by a presence sensor detecting an enclosed package and is ideal in extreme weather conditions to protect the package from environmental conditions.

Still further, in another embodiment, the container includes a camera focused on an area proximate to the exterior door. The camera responds to either activation of the exterior door's locking mechanism or the presence of a delivery personnel. This image is stored in an electronic data storage apparatus such as d Random Access Memory device for recording the image for later use if it becomes necessary to identify who activated the lock. An enhanced version of this embodiment communicates the image to a customer's cellular phone or other handheld electronic apparatus.

The transmission of the image to a cellular or a personal data apparatus is well known in the art and include, but is not limited to that described in U.S. Pat. No. 9,866,802, issued on Jan. 9, 2018, to Carter and entitled "Communication and Monitoring System"; U.S. Pat. No. 9,811,240, issued Nov. 7, 2017, to Kim et al. and entitled "Operating Method of Image Display Apparatus"; and, U.S. Pat. No. 9,843,743, issued Dec. 12, 2017, to Lewis et al. and entitled "Infant Monitoring Systems and Methods Using Thermal Imaging", all of which are incorporated hereinto by reference.

In one embodiment, the locking mechanism on an exterior door includes a physical barrier which is removed only when an authorized person is proximate. When this condition exists, an appropriate delivery personnel is present, then the barrier is removed (such as swinging up) allowing the delivery personnel to use their key (or to access the keypad) to open the exterior door. This embodiment is also used when the image is communicated to the owner of the container and allows the owner to remotely remove the barrier.

Those of ordinary skill in the art readily recognize a variety of techniques which permit the remote operation of a mechanism, including, but not limited to: U.S. Pat. No. 9,865,155, issued Jan. 9, 2018, to Cobb et al. and entitled "Notification of Visitors"; and U.S. Pat. No. 9,860,360, issued Jan. 2, 2018, to Shinar and entitled "System, Device, and Method of Wirelessly Controlling Electronic Devices and Appliances", both of which are incorporated hereinto by reference.

By placing the door (which will be automatically opened upon the presence of the arrival of a package) on the top of the receptacle, the container of this invention receives drone deliveries without any human delivery personnel.

The invention together with various embodiments thereof will be more fully explained by the attached drawings and the following description thereof.

DRAWINGS IN BRIEF

FIG. 1 graphically illustrates the distribution system of the present invention.

Figure 4:
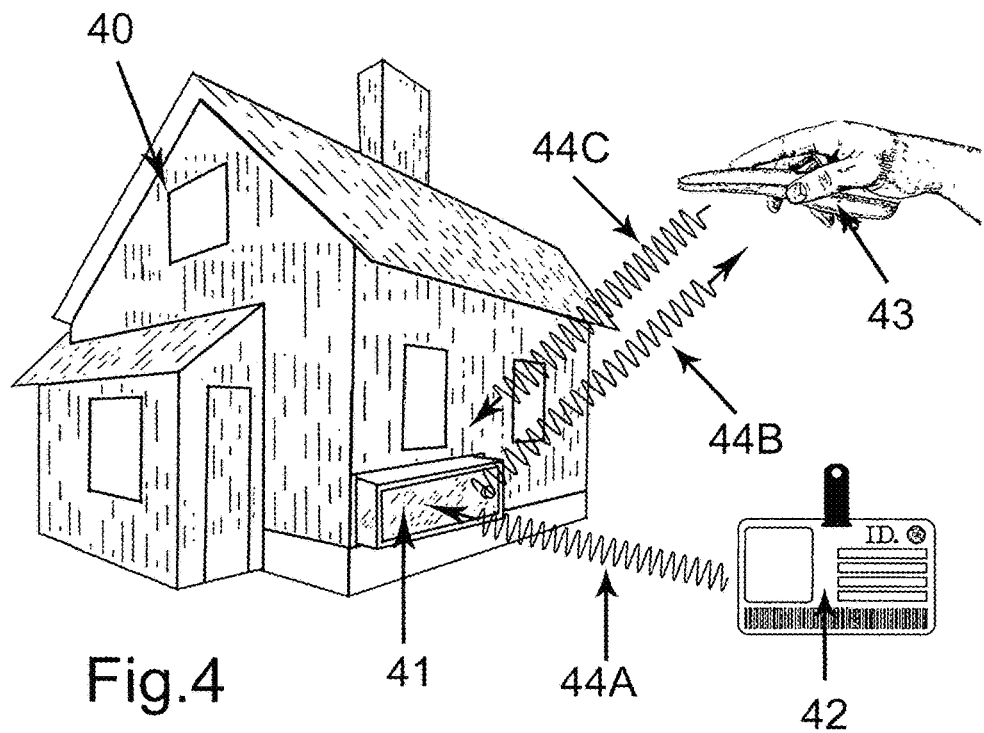

FIG. 4 graphically illustrates an embodiment of the invention which communicates with a remote apparatus to control operation/acceptance of a package.

Figure 5:
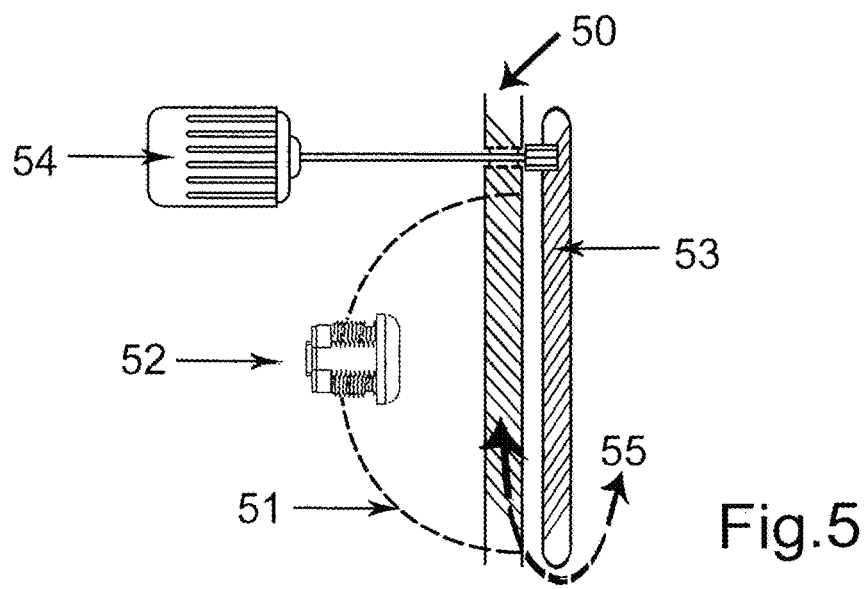

FIG. 5 illustrates an embodiment of the invention which utilizes a door to prevent access to the locking mechanism.

DRAWINGS IN DETAIL

Figure 1:
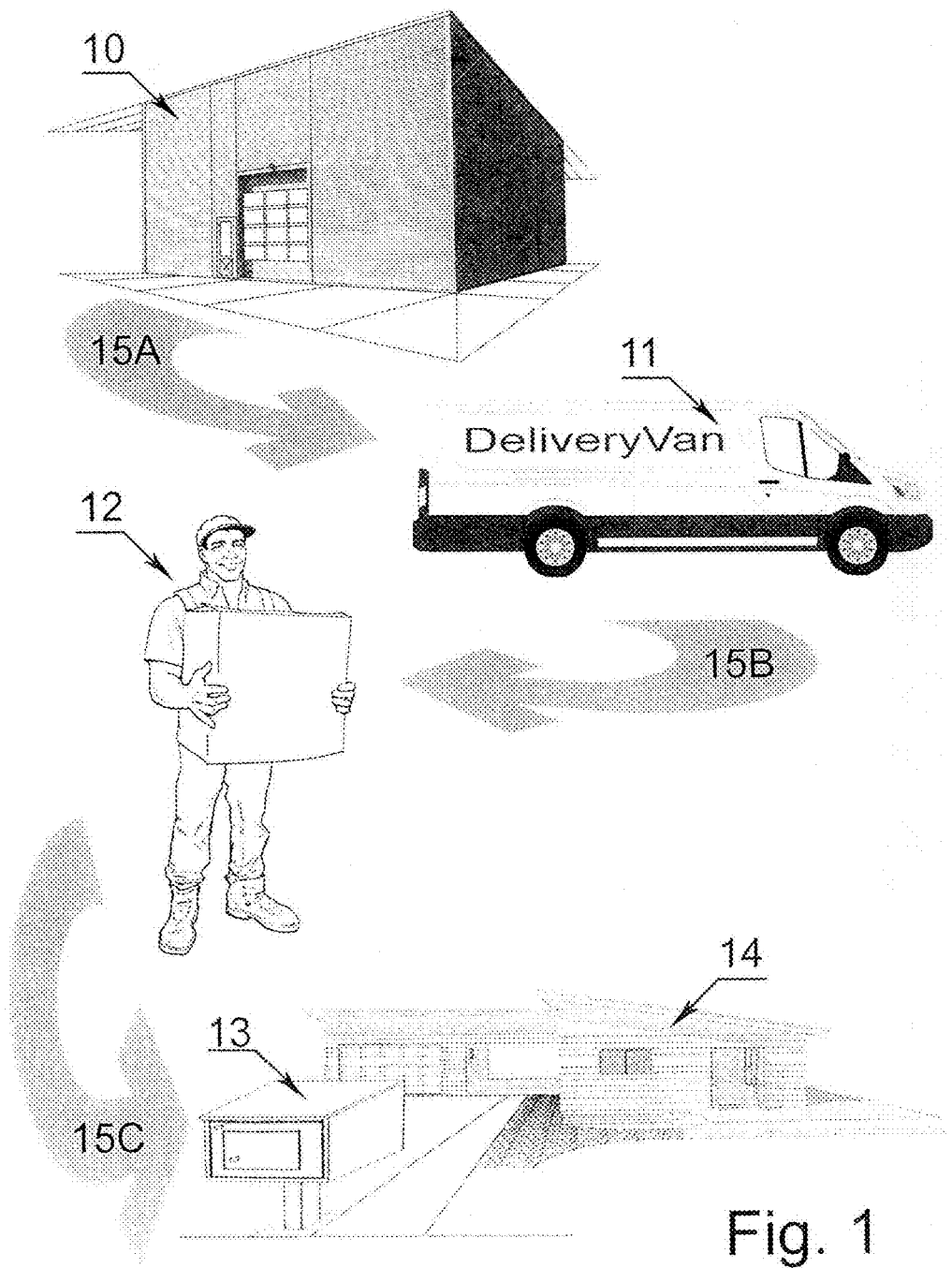

FIG. 1 graphically illustrates the distribution system of the present invention.

This illustration provides a graphical environment in which the present invention is utilized. A package is sent 15A from Warehouse 10 to the delivery van 11. The delivery van's operator 12 takes the package 15B and deposits it 15C, into container 13. In this illustration, container 13 is separate from the house 14 but the invention is not so limited.

The package is secured within container 13 until the recipient retrieves it from container 13.

Figure 2:
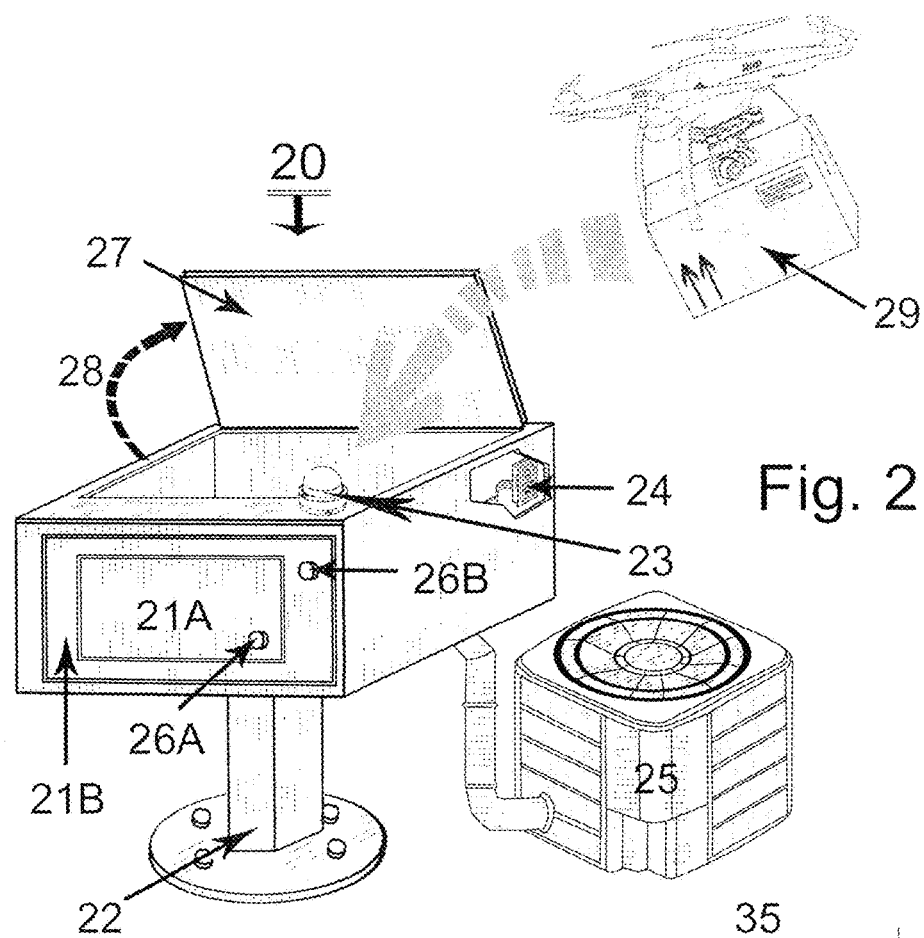
FIG. 2 illustrates and embodiment of the invention in which the interior of the container is environmentally maintained.

FIG. 2 illustrates and embodiment of the invention in which the interior of the container is environmentally maintained.

In this embodiment, container 20 is supported by stand 22. On one side of container 20 are two doors 21A and 21B. In this embodiment, door 21A is contained within door 21B, thereby allowing the delivery personnel to unlock door 21A via lock 26A. The recipient is able to retrieve the package via door 21B by using lock 26A.

Sensor 24, contained within container 20, determines if a package has been placed within container 20 and alerts the recipient via light 23. In certain climes, there is a need to either warm (for frigid climes) or cool (in hot climes) the package until it is retrieved by the recipient so that the contents do not go bad (e.g. chocolates being delivered in the Arizona summer). In this case, sensor 24 also activates the AC/heater 25 which has been previously set to either cool or heat appropriately.

Sensor 24, in some embodiments, also includes an electronic memory which is used to record when door 21A or door 21B is opened. This time stamps the use of the container as proof of the delivery of the package.

In one embodiment of the invention, door 27 opens (28) automatically when a package 29 is being delivered via a drone. The drone places package 29 into the container and departs. When the package is within container 20, door 27 closes and latches.

Figure 3:
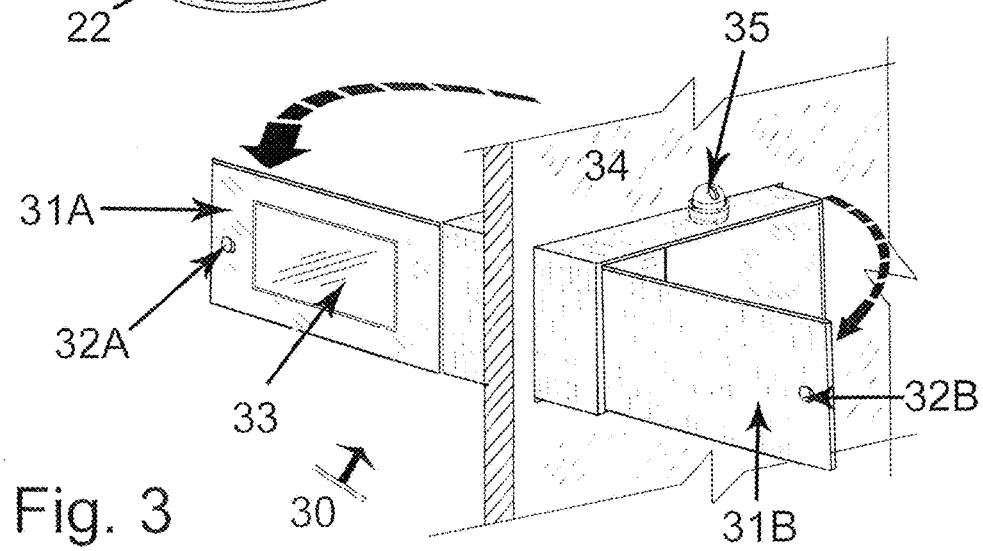
FIG. 3 illustrates an embodiment of the invention mounted into a wall of a dwelling.

FIG. 3 illustrates an embodiment of the invention mounted into a wall of a dwelling.

In this embodiment, container 30 is positioned in wall 34 so that an exterior door 31B, with lock 32B, is accessible to the delivery personnel. The package is placed within container 30 allowing the recipient to view through window 33 to see that a package exists. The recipient then unlocks door 31A via lock 32A and removes the package.

This embodiment is equipped with a sensor 35 which identifies when the delivery personnel arrives and also serves as a camera to record/time stamp the individual involved. Sensor 35, in some embodiments, is also a transmitter to inform the recipient that that a package has been delivered (as shown later).

As with earlier embodiments, this embodiment is optionally equipped with an environment control for the interior of container 30.

FIG. 4 graphically illustrates an embodiment of the invention which communicates with a remote apparatus to control operation/acceptance of a package.

As the delivery personnel, wearing badge 42, approaches building 40 with container 40, a sensor 41, as described earlier, receives signal 44A from the electronics within badge 42. This signal activates transmission 44B from container 40 to the owner/operator's handheld electronic apparatus 43. Transmission 44B communicates that an authorized person (as identified by badge 42) has approached container 40, and in one embodiment provides a picture of the individual. The owner/operator, via apparatus 43, then selectively enable the exterior lock (not shown) in container 41 via signal 44C.

Furthermore, in some embodiments, sensor 41 transmits the time stamp to the warehouse (discussed earlier) that deliver has been made. This permits the warehouse to keep up-to-date records relating to the package.

This embodiment provides an additional level of security providing real time notification and access/no access determination.

FIG. 5 illustrates an embodiment of the invention which utilizes a preliminary door/barrier to prevent access to the locking mechanism.

The container's door face 50 is shown. Recess 51 permits the locking mechanism 52 to be recessed behind the door and is accessible via an opening in the door (not shown). This embodiment is useful with the embodiment of FIG. 4 which allows the owner/operator to activate motor 54 to swing cover 53 as indicated arrow 55 away from the recess 51 so that the delivery personnel can unlock (via lock 52) the door.

It is clear that the present invention provides a secure and efficient package delivery system.

What is claimed is:

1. A package receptacle comprising:
   a) a container having a first and second door allowing entry into an interior of the container; wherein, in a locked state, the first door is secured by a first locking mechanism, and, wherein, in a locked state, the second door is secured by a second locking mechanism;
   b) a barrier mechanism adapted to selectively prevent access to the first locking mechanism;
   c) a camera focused on an area proximate to the first door, said camera being responsive to a presence proximate to first locking mechanism and producing an image thereof;
   d) communication means for communicating the image to a remote apparatus; and,
   wherein, the barrier mechanism is responsive to a signal from the remote apparatus to reveal the first locking mechanism.

2. The package receptacle according to claim 1, further including:
   a) a presence sensor adapted to determine if a package is within the container; and,
   b) an alert mechanism exterior to the container being responsive to the presence sensor.

3. The package receptacle according to claim 2, further including an electronic logging mechanism recording a time when the first door of the container is opened.

4. The package receptacle according to claim 1,
   a) wherein the first door is located at a top of the container; and,
   b) further including means to automatically open the first door when a package is proximately sensed.

5. The package receptacle according to claim 1, further including;
   a) a camera focused on an area proximate to the first door, said camera being responsive to activity and producing an image thereof; and, b) communication means for communicating the image to an owner of the receptacle.

6. The package receptacle according to claim 1, wherein, the container extends through a wall such that the first door is located on an exterior of the wall and the second door is located on an interior of the wall.

7. The package receptacle according to claim 6, wherein the second door includes a window for user viewing into an interior of the container.

8. The package receptacle according to claim 1, further including a security badge sensor secured to the container and directed toward a position proximate to the first door, said security badge sensor generating an indicia of a sensed badge and communicating said indicia to the electronic logging mechanism.

9. The package receptacle according to claim 8, wherein said security badge sensor disables the first locking mechanism until a security badge is sensed.

10. A package delivery system comprising:
  a) a distribution center containing packages configured for delivery to an individual entity by a carrier;
  b) a badge worn by the carrier identifying the carrier and having an electronic identifier of the carrier, said carrier delivering a selected package from the distribution center to a chosen location; and,
  c) a package receptacle located at the chosen location and being,
    1) a container having a first and second door allowing entry into an interior of the container; wherein, the first door is secured by a first locking mechanism responsive to the electronic identifier, the second door is secured by a second locking mechanism; and, an environmental system located within the container adapted to maintain a selected environmental condition within the container,
    2) a barrier mechanism adapted to selectively prevent access to the first locking mechanism,
    3) a camera focused on an area proximate to the first door, said camera being responsive to a presence proximate to first locking mechanism and producing an image thereof,
    4) communication means for communicating the image to a remote apparatus; and, wherein, the barrier mechanism is responsive to a signal from the remote apparatus to reveal the first locking mechanism; and,
    d) a logging mechanism recording a time stamp of the electronic identifier.

11. The package delivery system according to claim 10, wherein the package receptacle further includes a communication apparatus adapted to communicate the electronic identifier to the distribution center.

12. The package delivery system according to claim 10:
  a) further including a communication apparatus adapted to communicate with a remote mechanism; and,
  b) wherein the communication apparatus transmits the electronic identifier to the remote mechanism.

13. The package delivery system according to claim 12, wherein the first locking mechanism is responsive to a signal from the remote mechanism.

14. A package receptacle system comprising:
  a) a container having,
    1) a first door allowing entry into an interior of the container; wherein, in a locked state, the first door is secured by a first locking mechanism located outside an edifice said first locking mechanism responsive to a first key,
    2) a second door allowing entry into an interior of the container from an interior of the edifice, a camera focused on an area proximate to the first door, said camera being responsive to a presence proximate to first locking mechanism and producing an image thereof; and,
    3) A barrier mechanism selectively blocking access to the first locking mechanism;
  b) a camera focused on a position in front of the first locking mechanism and generating images thereof, and,
  c) a remote receiver receiving images from the camera, and, wherein the barrier mechanism is responsive to signals from the remote receiver.

15. The package receptacle system according to claim 14, wherein the container includes an environmental system adapted to maintain a selected environment within the container.

16. The package receptacle system according to claim 14, further including a security badge sensor secured to the container and directed toward a position proximate to the first door, said barrier mechanism being in a locked position until a security badge is sensed.

* * * * *